United States Patent
Gornick et al.

[19]

[11] Patent Number: 5,971,651
[45] Date of Patent: Oct. 26, 1999

[54] COUPLER FOR JOINING MOVABLE MEMBERS

[75] Inventors: Steven W. Gornick, Oxford; Michael A. Vancamp, Swartz Creek, both of Mich.

[73] Assignee: General Motors Corporation, Detroit, Mich.

[21] Appl. No.: 09/197,780

[22] Filed: Nov. 23, 1998

[51] Int. Cl.⁶ .................................. G05G 9/12; B60Q 1/06
[52] U.S. Cl. ........................ 403/79; 403/329; 403/161; 403/157; 403/14; 74/436.36
[58] Field of Search .............................. 403/119, 79, 67, 403/326, 329, 315, 319, 161, 157, 150, 13, 14; 74/436.36

[56] References Cited

U.S. PATENT DOCUMENTS

| | | | |
|---|---|---|---|
| 3,475,716 | 10/1969 | Laig | 403/315 X |
| 3,926,068 | 12/1975 | Jantzen et al. | 74/436.36 X |
| 4,822,197 | 4/1989 | DeMartino et al. | 403/157 X |
| 5,277,078 | 1/1994 | Osborn et al. | 403/329 X |
| 5,335,522 | 8/1994 | Stadelmann et al. | 403/79 X |
| 5,428,519 | 6/1995 | Salmon et al. | 403/326 X |

Primary Examiner—Lynne Reichard
Assistant Examiner—John R. Cottingham
Attorney, Agent, or Firm—Dean L. Ellis; Michael J. Bridges

[57] ABSTRACT

A coupler that provides a selectively releasable connection between first and second relatively movable members. Such a coupler has a receiver that is secured to the first relatively movable member. The receiver is bifurcated to present a gudgeon having laterally spaced, generally parallel, side walls. A socket is located in each side wall to be disposed in spaced opposition. Each socket has guide surfaces that flare outwardly from a first race to terminate in an entrance. The second relatively movable member presents a transversely oriented trunnion. The trunnion has bearing surfaces that are selectively insertable within the opposed sockets operatively to engage said first races. A generally U-shaped locking verification clip has a base wall and laterally spaced first and second side walls. A pair of pedestals extend from the base wall in laterally spaced, substantially parallel, disposition between the side walls. Each pedestal terminates in a second race. The second races also operatively engaging the bearing surfaces on the trunnion in opposition to the engagement of the bearing surfaces with the first races. A locking mechanism selectively secures the locking verification clip to the receiver so as to capture the bearing surfaces on the trunnion with respect to the first and second races.

18 Claims, 6 Drawing Sheets

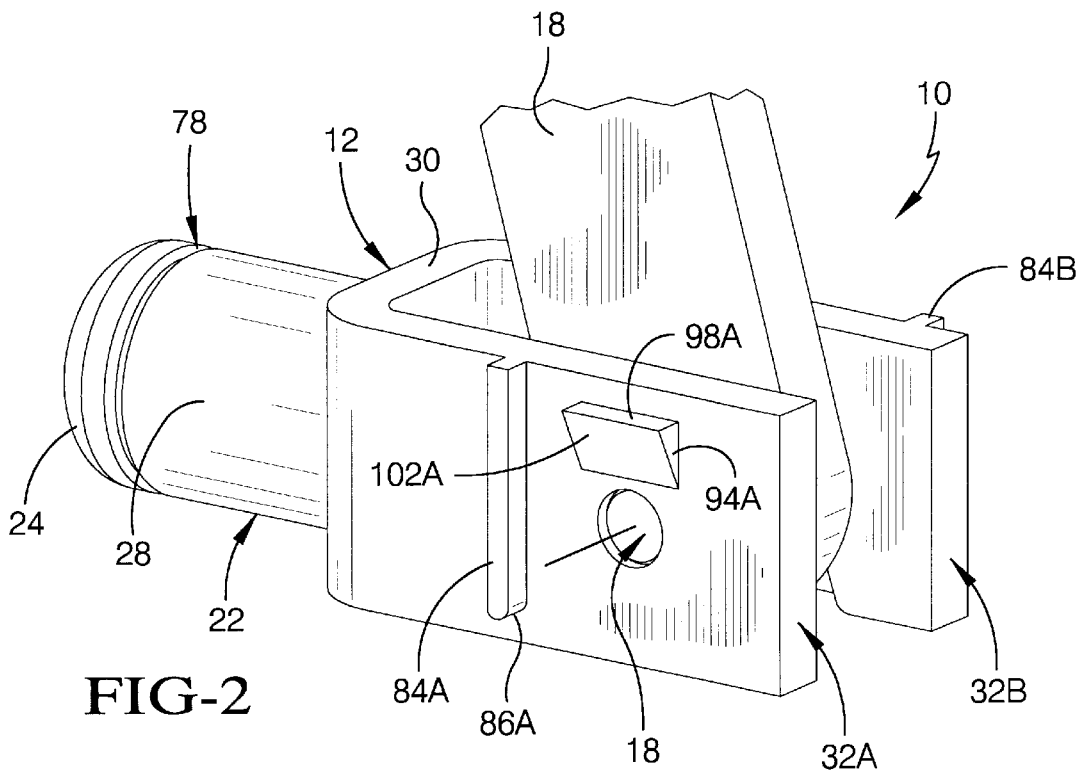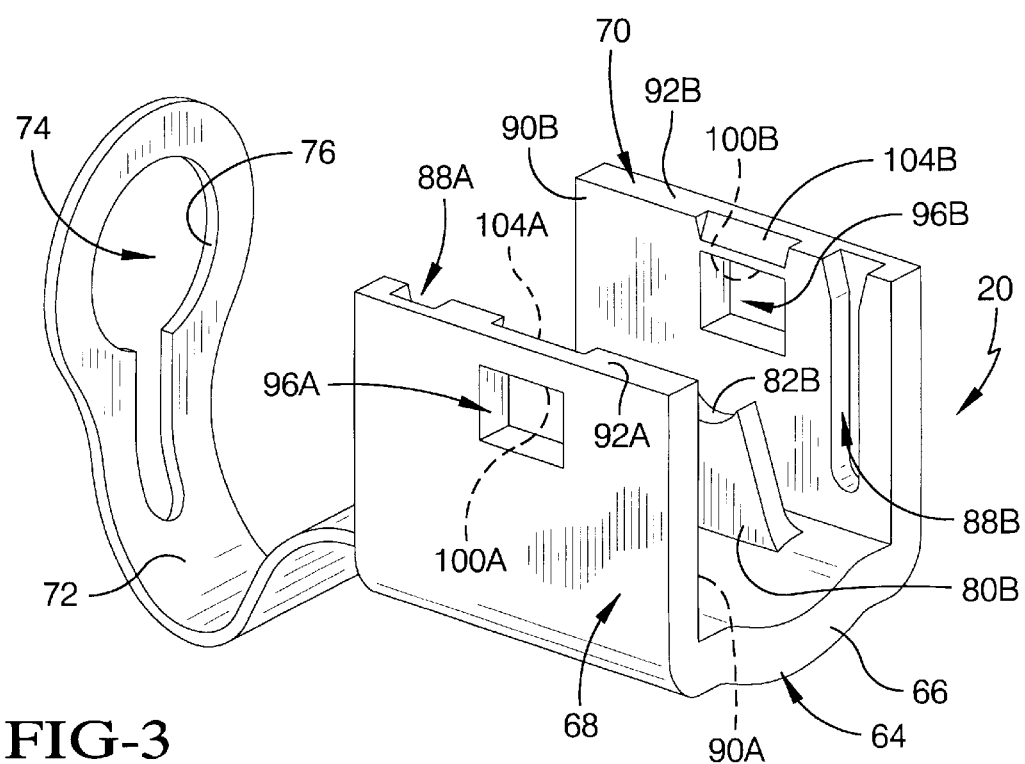

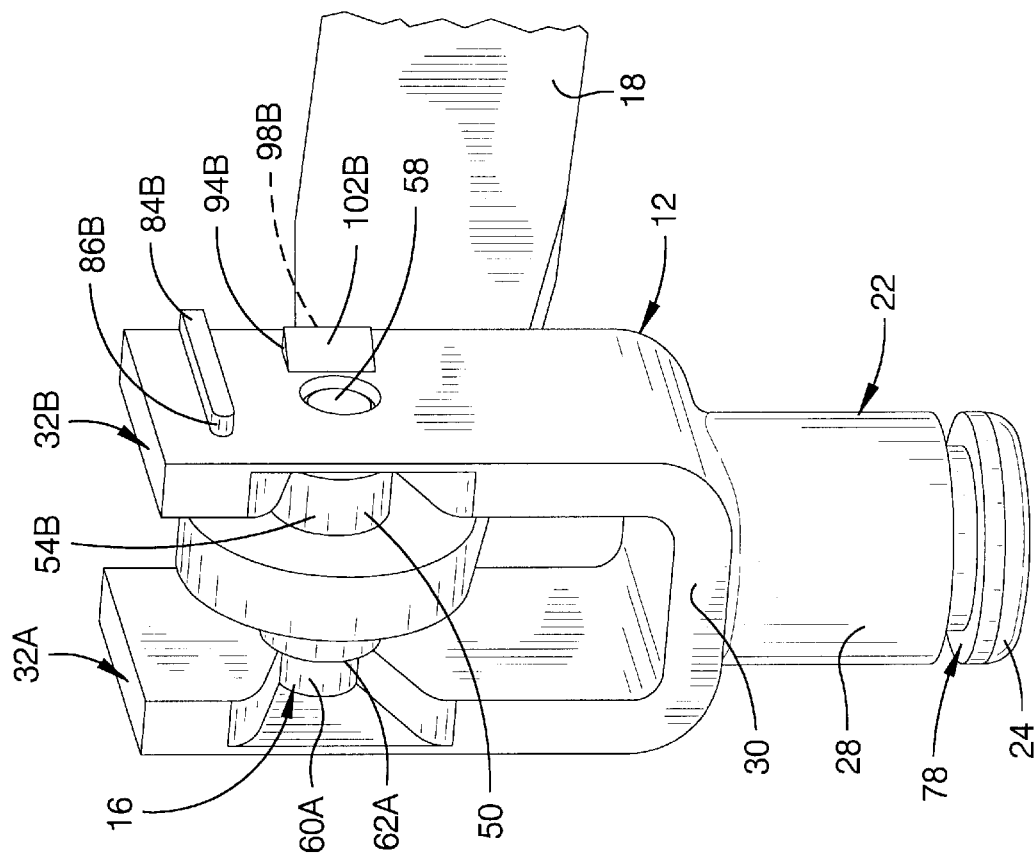
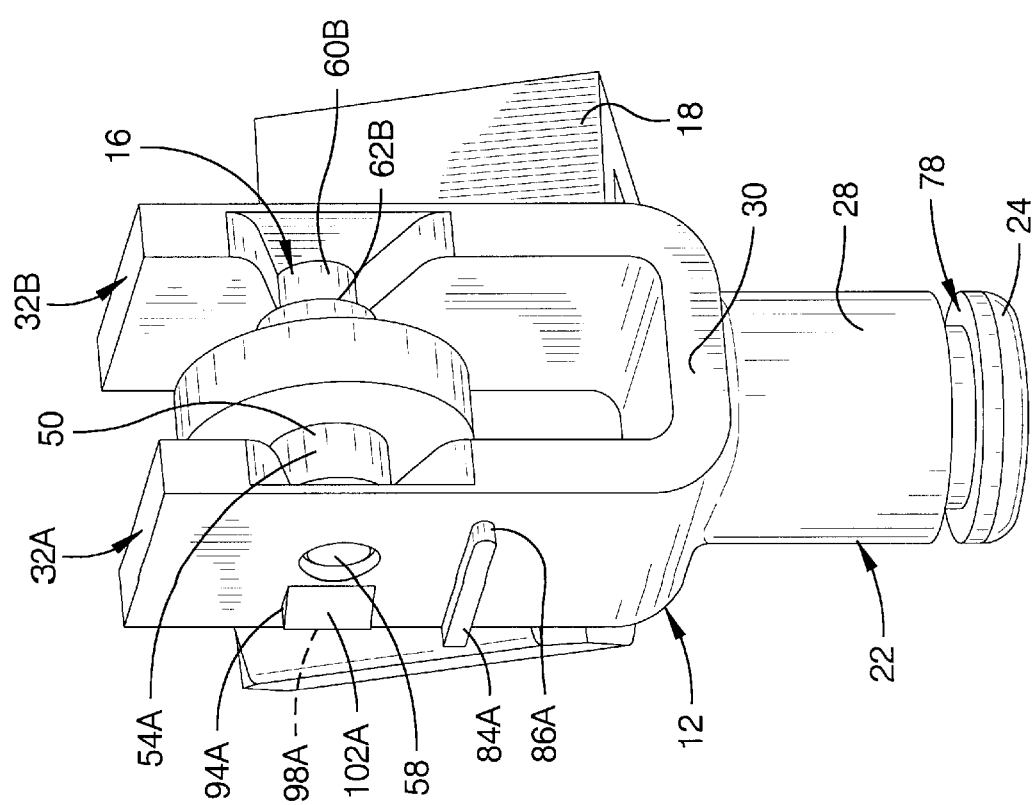

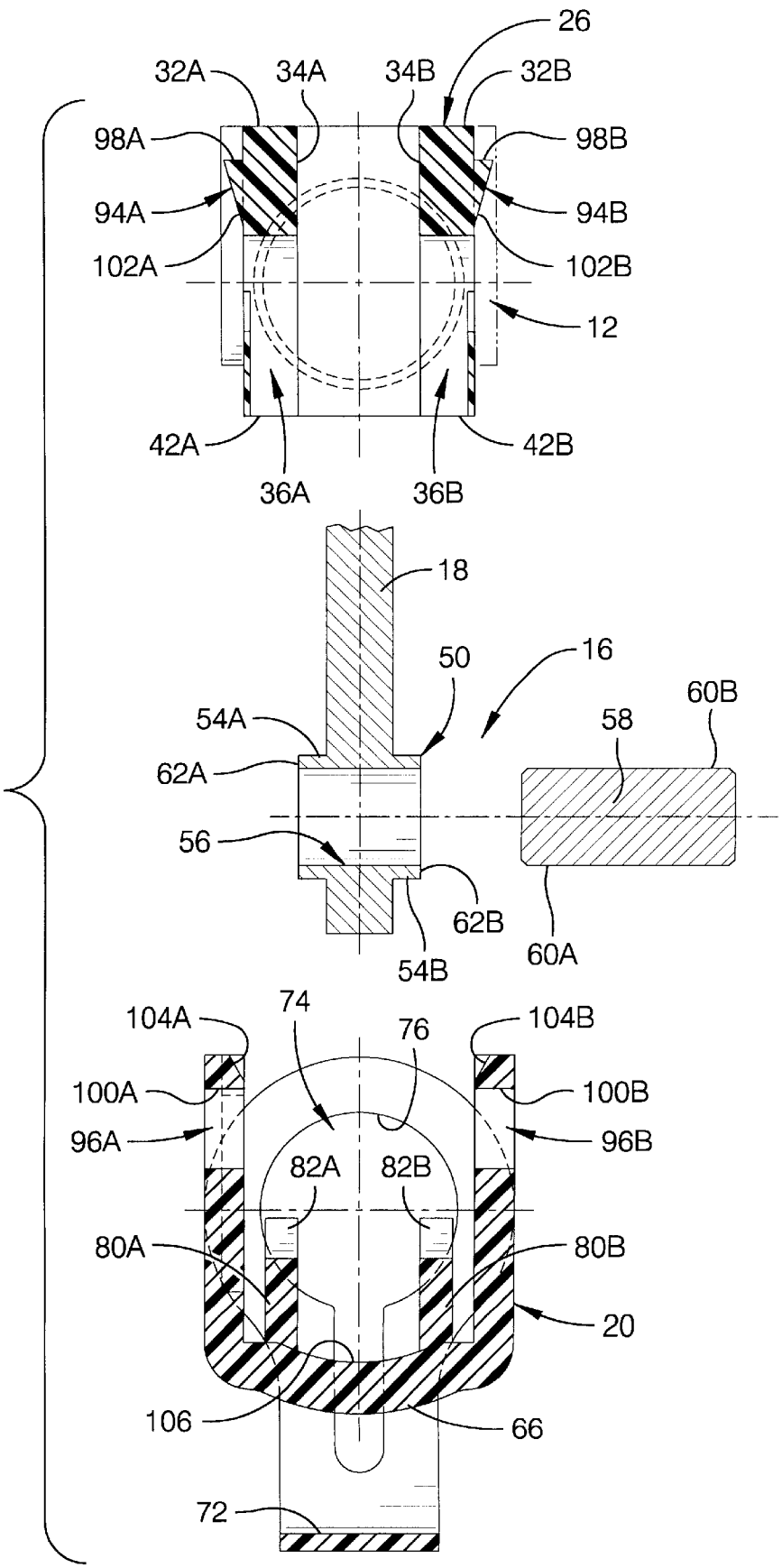

COUPLER FOR JOINING MOVABLE MEMBERS

TECHNICAL FIELD

The present invention relates generally to couplers for effecting a facile connection between movable members. More particularly, the present invention relates to couplers for effecting a releasable connection between an axially translatable member, such as a rod, and a pivotal member such as a lever arm that swings about an axis oriented generally transversely with respect to the axis along which the rod translates. Specifically, the present invention relates to a coupler by which to effect, if necessary, with one hand, a blind connection between an input operating rod and the selector lever of a transmission without tools or loose parts.

BACKGROUND OF THE INVENTION

Historically, the connection between an operating rod (i.e., an activating member) and the selector, or shift, lever (i.e., the actuated member) of a transmission has required the use of one or more loose parts such as pins, washers, cotter keys, E clips, nuts, bolts, screws or other such devices that are, for the most part, installed with hand tools. Moreover, the physical location of such connections is not always visually accessible and is often located in an environment which precludes physical accessibility by both of the assembler's hands - - - or even by one hand and a hand tool.

The operating rod may be the last structural element in a mechanical linkage system, which operatively joins a remote input, or operator controlling, device to an output, or controlled, device. Mechanical linkage systems may include a widely known variety of cables and/or other mechanisms that convert between linear and rotary motions and which are customarily used in automotive, truck, aircraft, recreational and marine environments. These motion transferring mechanisms are often necessary because the most desired location from which to operate the controlled output device is often not adjacent thereto but rather from a remotely located operator controlling, or input, device.

Motion transmitting arrangements that typically operate in a pushing and/or pulling manner have been employed for years as cable controls for automatic transmissions, parking brakes, clutches, cruise control devices and shifting devices where such assemblies are not only remote from the operator controlling device but also separated such that the interconnection therebetween must follow a nonlinear path.

Known motion transmitting arrangements utilize one or more cables that are axially movable in a pushing or pulling manner for operatively connecting the remote operator controlling device to an arm, or similar lever mechanism, that adjusts, shifts, or otherwise acts on the remote controlled device. One example that exemplifies a typical installation comprises the operation of a transmission assembly where the motion transmitting arrangement is attached to an operator controlling device in the nature of a gear selecting device at one end of a motion transmitting arrangement, and a lever arm in the nature of a gear actuating member presented from the transmission shifting mechanism at the other end. A second example would be a carburetor, or throttle, assembly where a motion transmitting arrangement is attached to an operator controlling device in the nature of an accelerator at one end thereof and is attached to the throttle mechanism, such as a carburetor, at the other end.

A flexible force transmitting mechanism such as a core that is either pushed or pulled within a tubular casing is often employed to effect the desired interconnection between an operator controlling device and a remotely located controlled device. The core of such a force transmitting mechanism is capable of effecting mechanical motion in either direction when at least the ends of the cable casing are satisfactorily clamped in position. Typically, the ends of such casings are secured in a fixed location by a clamping device held in place by a plurality of nuts and bolts (or screws) and lock washers. Each end of the core within the casing is connected to an operating, or end, rod. The other end of one operating rod is connected to the operator controlling input device, and this is normally effected by a fixedly positioned nut and bolt connection. The other end of the second operating rod is connected to the controlled output device, as by a clevis that is selectively positionable along the second operating rod and secured in the desired location by a lock nut. In turn, the clevis is secured to the lever arm on the controlled output device by a well known pin, washer and cotter pin arrangement.

The aforesaid historic arrangements for securing a flexible force transmitting cable core to the operator controlling input device and to the controlled output device has, more recently, been replaced by "snap on snap-off" connectors. Such connectors utilized to date in the automotive industry, for example, have required virtually as much force to snap on as to snap off. In fact, the best known prior art connector acceptable to the automotive industry required 85 Newtons to effect a snap on and 90 Newtons to effect a snap off. Other industry standards require that the connector withstand 50,000 cycles under loads of 90 Newtons in a tension/compression testing. Moreover, the connector must also withstand a minimum of 450 Newtons before separation of the terminal end fitting from the end rod occurs.

Industries using the push/pull force transmitting control cables have not been able to achieve a desired, significantly lower snap on force while maintaining the required minimum snap off force. In addition, the best known prior art arrangements have been limited to three snap on and snap off cycles. It must also be appreciated that the structural differences from installation to installation virtually assures that it will seldom occur that the axis of the end rod can be precisely aligned perpendicularly with respect to the rotational axis of the operating lever on the controlled output device. As is well known to those skilled in the appropriate arts, the prior known terminal end fittings often do not provide the desired ease of operation when subjected to such misalignment.

SUMMARY OF THE INVENTION

A primary aspect of the present invention provides a novel coupler, the assembly of which can be readily effected in locations presenting restricted access, both visually and physically. The novel coupler can be manually assembled, with relative ease by the use of only one hand, and can be assembled and disassembled without the need for either tools or loose parts. Moreover, the assembly and disassembly forces are minimal and yet the connection effected thereby cannot be inadvertently disconnected without virtual destruction of the connector. The novel coupler not only permits a virtually unlimited number of assembly and disassembly cycles, but also effectively isolates noise and vibration from being transferred therethrough, and at the same time readily accommodates modest misalignments typically encountered between the axis of the operating rod with respect to the rotational axis of the lever presented by the controlled output device to which the rod is operatively connected.

In general, a coupler embodying the preferred concepts of the present invention is adapted for effecting a selectively releasable connection between first and second relatively movable members. Such a coupler has a receiver that is secured to the first relatively movable member. The receiver is bifurcated to present a gudgeon having laterally spaced, generally parallel, side walls. A socket is located in each side wall to be disposed in spaced opposition. Each socket has a generally semi-cylindrical first race intersected by guide surfaces that flare outwardly from the first race to terminate in an entrance.

The second, relatively movable member presents a transversely oriented trunnion. The trunnion has longitudinally spaced bearing surfaces. The bearing surfaces are insertably received within the opposed sockets operatively to engage the races presented therein. A generally U-shaped locking verification clip has a base wall and laterally spaced first and second side walls. A pair of pedestals extend from the base wall in substantially parallel, laterally spaced disposition between the side walls. Each pedestal terminates in a second race. The second races also operatively engage the longitudinally spaced bearing surfaces on the trunnion, but in opposition to the engagement of the bearing surfaces by the first races. A locking arrangement selectively secures the locking verification clip to the receiver so as rotatably to capture the bearing surfaces on the trunnion between the first and second races.

To acquaint persons skilled in the arts most closely related to the present invention, one preferred embodiment of a coupler that illustrates a best mode now contemplated for putting the invention into practice is described herein by, and with reference to, the annexed drawings that form a part of the specification. The exemplary coupler is described in detail without attempting to show all of the various forms and modification in which the invention might be embodied. As such, the embodiment shown and described herein is illustrative, and, as will become apparent to those skilled in these arts, can be modified in numerous ways within the scope and spirit of the invention; the invention being measured by the appended claims and not by the details of the specification.

BRIEF DESCRIPTION OF THE DRAWINGS

FIG. 2 is an enlarged, perspective view of the coupler that is depicted in FIG. 1, but with the locking verification clip having been removed;

FIG. 3 is, similarly, an enlarged, perspective view of the locking verification clip separate from those portions of the coupler secured to the axially translatable rod and the lever arm;

FIG. 6 is a view similar to FIG. 4 but with the trunnion associated with the swinging lever arm operatively received in the bifurcated gudgeon;

FIG. 7 is a view similar to FIG. 6 and thus taken from a coign of vantage displaced approximately 90° relative to that location within the horizontal plane from which FIG. 6 was taken;

DESCRIPTION OF THE PREFERRED EMBODIMENT

Figure 1:
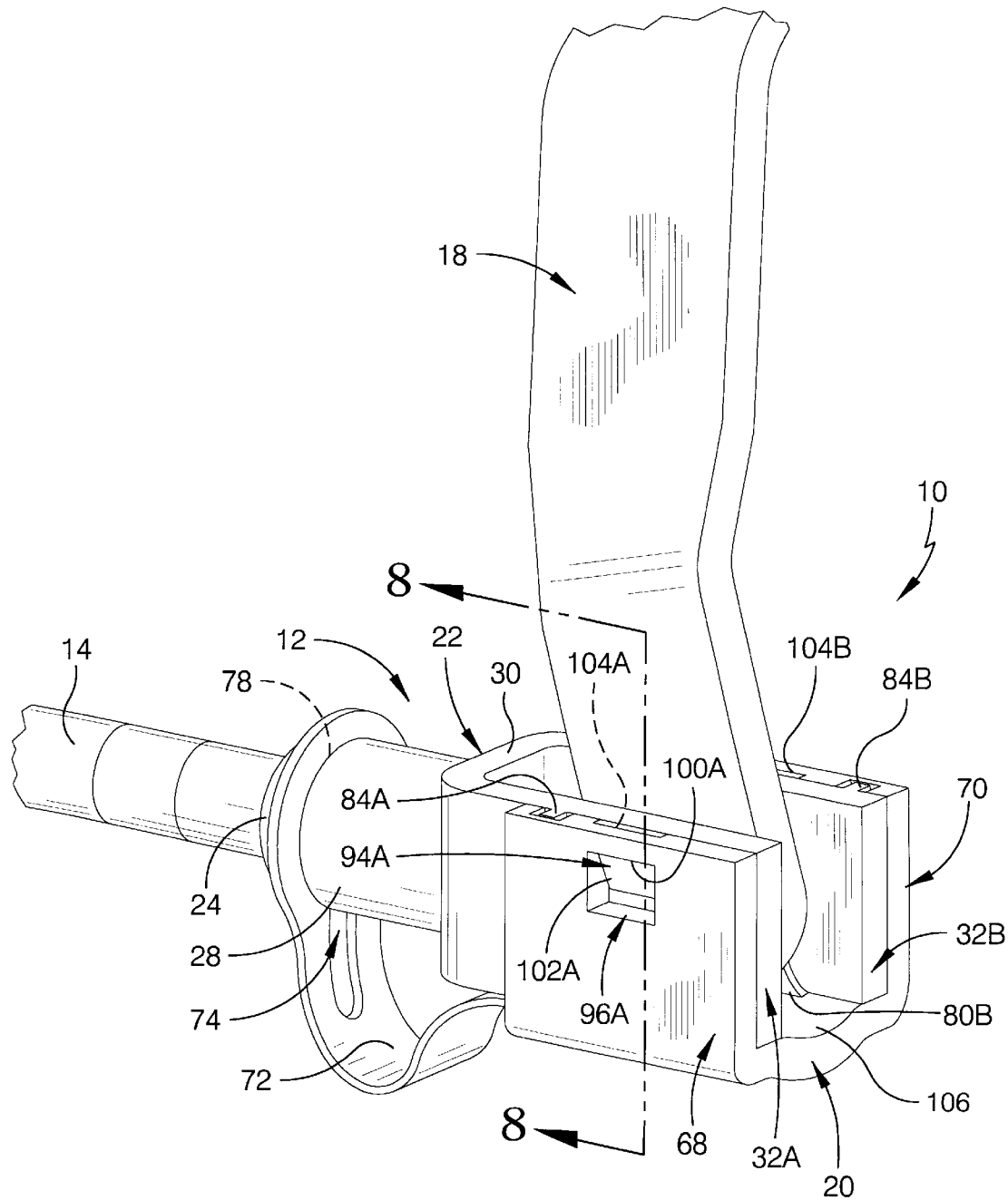
FIG. 1 is a perspective view of a coupler embodying the concepts of the present invention used operatively to join an axially translatable rod to a lever arm that swings about an axis oriented generally transversely of the axis along which the rod translates.
Figure 8:
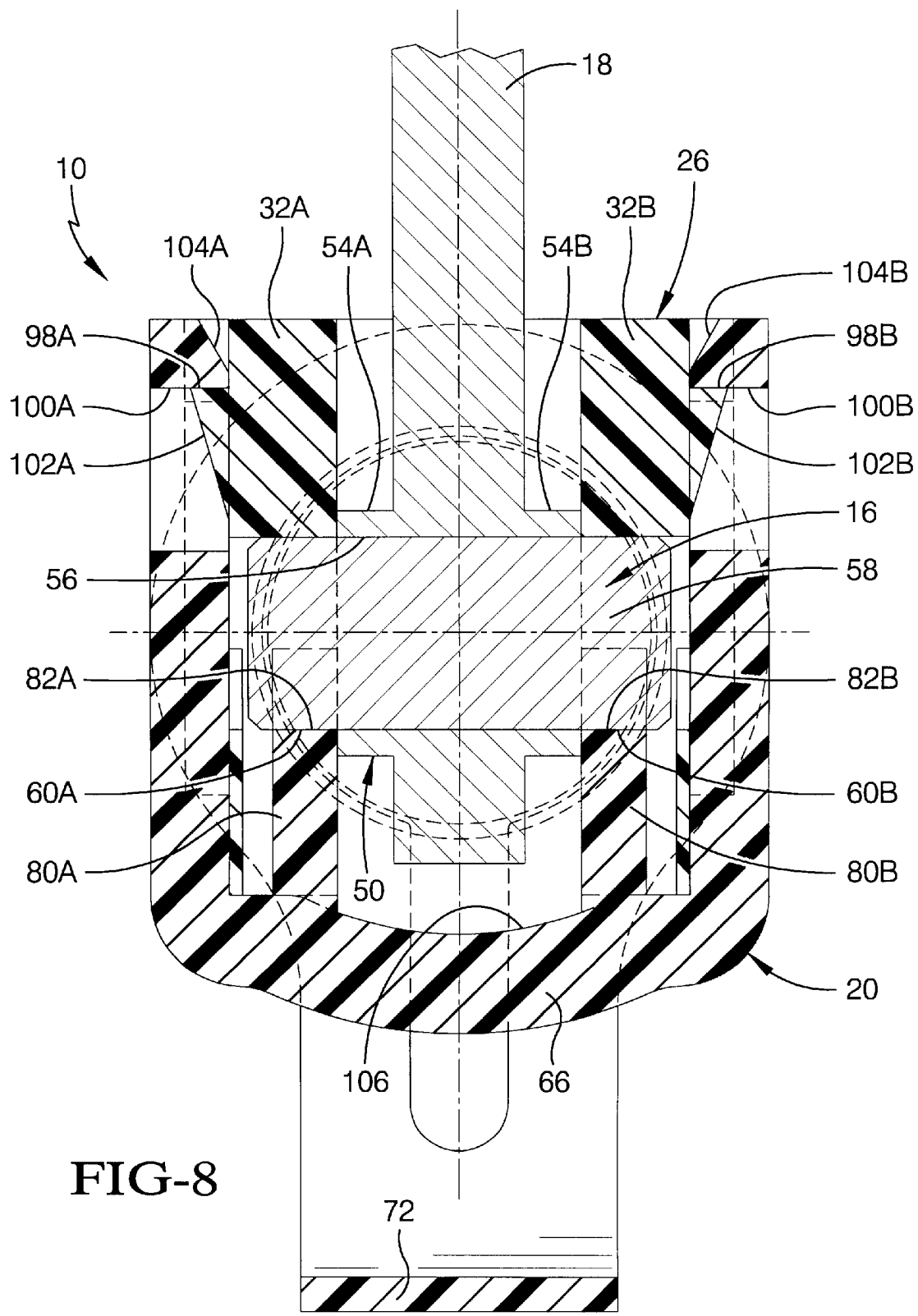
FIG. 8 is an enlarged, vertical section of the coupler taken substantially along line 8 - - - 8 of FIG. 1; and, FIG. 9 is an slightly reduced, exploded section of the coupler as depicted in the vertical section of FIG. 8.

With reference to the drawings, a coupler embodying the concepts of the present invention is designated generally by the numeral 10 on FIGS. 1 and 8. The representative coupler 10 comprises three primary components. The first primary component is a receiver - - - generally designated by the numeral 12 - - - that is secured to an axially translatable member such as an operating, or end, rod 14. The second primary component is a trunnion 16 (FIGS. 6 through 9) that is secured to a lever arm 18 that may, for example, be the selector lever of a vehicular transmission. The third primary component of the coupler 10 is a locking verification clip 20 (individually detailed in FIGS. 3, 8 and 9) that releasably secures the trunnion 16 to the receiver 12.

The receiver 12 (which is independently detailed in FIGS. 4 and 5) comprises a tripartite housing 22. That is, the receiver housing 22 has a connecting sheath portion 24 at the inboard end thereof, and a bifurcated gudgeon 26 at the outboard end thereof. The sheath 24 and the gudgeon 26 are joined by an isolator 28 located medially of the inboard and outboard end portions, respectively, of the receiver housing 22.

The connecting sheath portion 24 may be permanently secured to the operating rod 14, as depicted in FIG. 1, and as such, the connecting sheath portion 24 may be a plastic material that circumscribes, and is permanently secured to, the outer end of the operating rod 14. The isolator portion 28 may also be a plastic material that is integrally formed with the connecting portion 24. In any event, the isolator portion 28 should be sufficiently flexible to dissipate any vibrations that are applied to either end of the receiver housing 22 and thereby insulate those vibrations from the opposite end of the receiver housing 22. That is, vibrations imposed upon the sheath portion 24, as by the operating rod 14, are absorbed within the isolator 28 so as not to be transmitted to the lever arm 18 through the bifurcated gudgeon portion 26. Conversely, vibrations imposed upon the bifurcated gudgeon portion 26, as by the lever arm 18, will not be transmitted to the operating rod 14 by the sheath portion 24.

Figure 5:
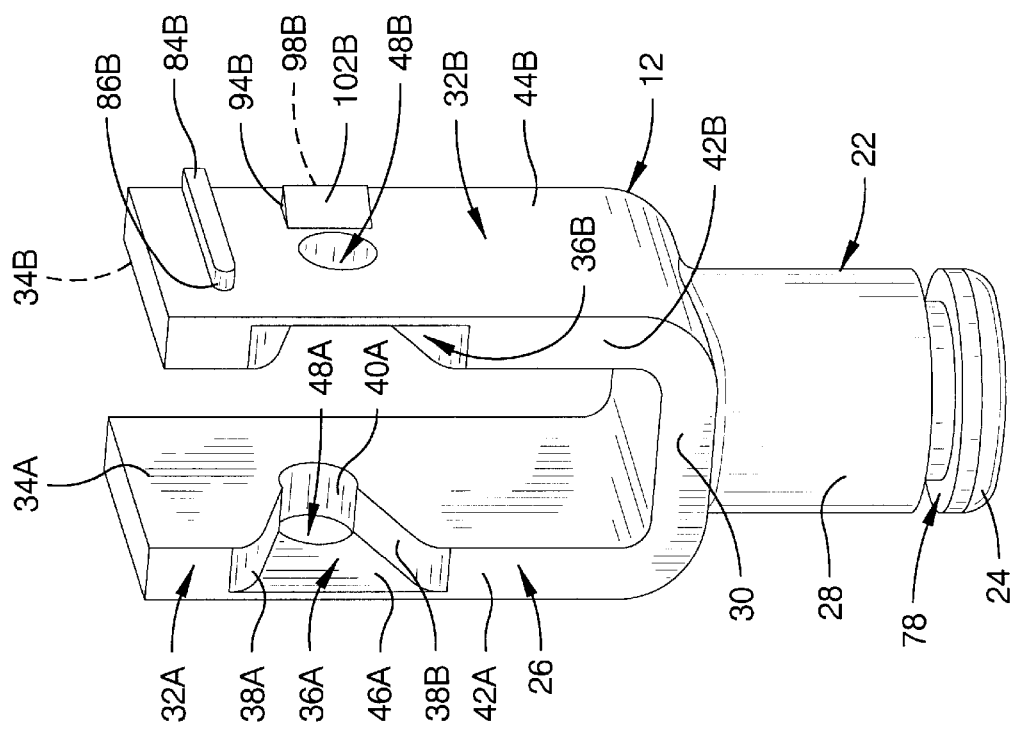
FIG. 5 is a view similar to FIG. 4 but taken from a coign of vantage displaced approximately 90° relative to that location within the horizontal plane from which FIG. 4 was taken.
Figure 4:
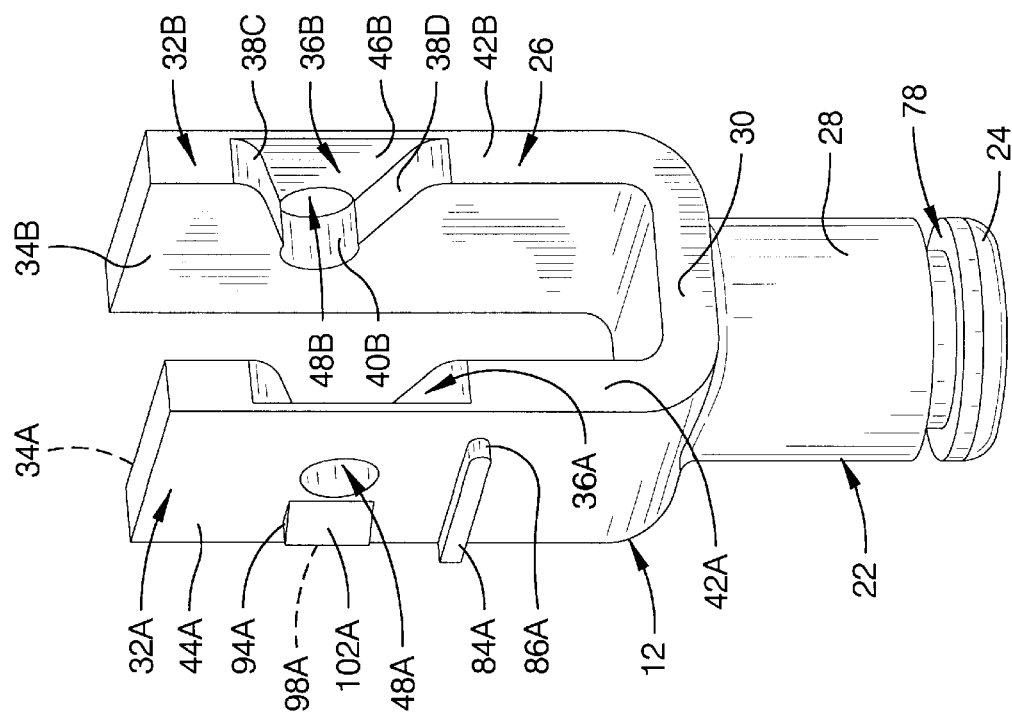
FIG. 4 is an enlarged perspective view of the receiver, said view depicting the entry portions to the bifurcated gudgeon as well as one exterior surface and one of the opposed facing surfaces on the legs of the U-shaped gudgeon.

As best seen in FIGS. 4 and 5, the bifurcated gudgeon portion 26 may have a generally U-shaped configuration with a base 30 that is secured to the isolator 28. A pair of laterally spaced, generally parallel, side walls 32A and 32B extend outwardly from the base 30, and away from the isolator portion 28, to comprise the generally U-shaped configuration.

As should be appreciated from the preceding paragraph, in the detailed description which follows, a particular structural member, component or arrangement may be employed at more than one location. When referring generally to that type of structural member, component or arrangement, a common numerical designation shall be employed. However, when one of the structural members, components or arrangements so identified is to be individually designated, it shall be referenced by virtue of a letter suffix employed in combination with the numerical designation employed for general identification of that structural member, component or arrangement. Thus, there are at least two laterally spaced, generally parallel, side walls which are generally identified by the numeral 32, but the specific, individual side walls are, therefore, identified as 32A and 32B in the specification and on the drawings. This same suffix convention shall be employed throughout the specification.

Opposedly facing surfaces 34A and 34B on the respective side walls 32A and 32B are recessed to present opposed sockets 36A and 36B that are recessed into the opposed surfaces 34A and 34B. Socket 36A has a pair of flared guide surfaces 38A and 38B that diverge outwardly from a generally semi-cylindrical race 40A to open through an access edge 42A of the side wall 32A. Similarly, socket 36B has a pair of flared guide surfaces 38C and 38D that diverge outwardly from a generally semi-cylindrical race 40B to open through access edge 42B. As will be hereinafter more fully explained in conjunction with a description of the procedure by which a coupler embodying the concepts of the present invention is assembled, each race 40 may extend circumferentially for slightly more than 180° to intercept the inner ends of the guide surfaces 38 in that socket 36 in which the particular race 40A or 40B is located.

With continued reference to FIGS. 4 and 5, the sockets 36 preferably do not completely penetrate exterior surfaces 44A and 44B of the side walls 32A and 32B, respectively, but rather allow a web 46 to define the outer extremity of each socket and thereby enhance the structural integrity of the side walls 32. The webs 46A and 46B may, however, be respectively penetrated by circular openings 48A and 48B, but it should be understood that the circular openings 48 do not perform any function other than to permit the extraction of a core (not shown) that may be employed to define the races 40 should the housing 22 be fabricated by a molding process.

As best seen in FIGS. 8 and 9, the trunnion 16 is secured to the outer end portion of the lever arm 18 operatively to engage the bifurcated gudgeon 26 that is secured to the distal end of the operating rod 14. The trunnion 16 may be fabricated from a single piece that is secured to the lever arm 18 or, as shown, the trunnion 16 may include a hub portion 50 that may be an integral component of the lever arm 18 and as such may be located in proximity to the outer end thereof. Bosses 54A and 54B extend outwardly from the hub portion 50, one on each side of the lever arm 18. The bosses 54A and 54B are disposed transversely of the lever arm 18 and in alignment with each other. A bore 56 extends transversely through the hub portion 50 to be centered concentrically within the thus defined bosses 54A and 54B to receive a pivot pin 58 that may preferably be secured to the hub portion 50.

Cylindrical exterior surfaces, one on each end of the pivot pin 58 extend outwardly of the respective bosses 54A and 54B to define transversely disposed, longitudinally spaced, cylindrical bearing surfaces 60A and 60B. The bosses 54 preferably extend outwardly from the lever arm 18 to terminate in bearing surfaces 62A and 62B that are oriented transversely with respect to the pivot pin 58 and are adapted slidingly to engage the opposed faces 34A and 34B, respectively, on the side walls 32A and 32B of the bifurcated gudgeon portion 26 of the receiver housing 22. Bearing surfaces 60A and 60B are dimensioned pivotally to engage the recesses 40A and 40B within the respective sockets 36A and 36B in the laterally spaced, generally parallel, side walls 32A and 32B of the bifurcated gudgeon 26. Bearing surfaces 60A and 60B also interact with the locking verification clip 20, as will be hereinafter more fully described.

With particular reference to FIG. 3, the locking verification clip 20 has a generally U-shaped body portion 64 comprising a transverse base wall 66 and laterally spaced first and second side walls 68 and 70, respectively. A preferably flexible tether strap 72 is attached to the body portion 64 and, as shown, extends outwardly from one edge on the transverse base wall 66 of the U-shaped body portion 64. A keyhole aperture 74 penetrates the tether strap 72 in spaced relation outwardly of the U-shaped body portion 64. The keyhole aperture 74 permits the tether strap 72 to be button-holed onto the connecting sheath portion 24 of the tripartite receiver housing 22 such that a generally circular, inner edge portion 76 of the keyhole aperture 74 may be received within a circumferential notch 78 in the sheath portion 24 of the receiver housing 22.

A pair of laterally spaced pedestals 80A and 80B extend outwardly from the transverse base wall 66 in generally parallel relation to each other and to the side walls 68 and 70. It should also be observed that the pedestals 80 extend outwardly from the base wall 66 in the same direction as the side walls 68 and 70. The pedestals 80A and 80B terminate in second races 82A and 82B, respectively. The pedestals 80 convergingly taper from the base wall 66 to the second races 82 in order to permit the pedestals to be insertably and, if desired, embracingly received between the flared guide surfaces 38 of the respective sockets 36A and 36B.

A locating rib 84 is provided on the exterior surface 44 of each gudgeon side wall 32 (FIGS. 4 and 5). One end of each locating rib 84 is preferably rounded to present a nose 86 by which to facilitate entry of each locating rib into the appropriate locating recess 88 in the opposed facing surfaces 90A and 90B of the side walls 68 and 70 in the locking verification clip 20. Entry of the locating rib 84 into the respective locating recesses 88 may be further facilitated by flaring that end of the locating recess which opens through free edges 92A and 92B of the respective locking verification clip side walls 68 and 70.

As shown, the mating locating ribs 84 and the locating recesses 88 may be staggered. That is, locating rib 84A and the mating locating recess 80A are spaced in one direction from the location of the trunnion 16 when the coupler 10 is assembled, whereas the locating rib 84B and the mating locating recess 88B are spaced in the opposite direction from the trunnion 16. The interaction of the locating ribs 84 within their mating locating recesses 88 assures that the locking verification clip 20 engages the bifurcated gudgeon 24 with absolutely consistent orientation whenever the locking verification clip 20 engages the gudgeon 26. As such, a locking pawl 94 on the exterior surface 44 of each gudgeon side wall 32 operatively engages the corresponding lock notch 96 in the side walls 68 and 70 of the locking verification clip 20. That is, an engagement surface 98 on each of the locking pawls 94A and 94B on gudgeon side walls 32A and 32B, respectively, engage a blocking surface 100 on the lock notches 96A and 96B in the respective side walls 68 and 70 of the locking verification clip 20.

In addition to the lock engagement surface 98 which is disposed generally perpendicularly to the exterior surfaces 44 of the gudgeon side walls 32, each locking pawl 94 also presents an inclined camming surface 102. The inclined camming surfaces 102 are provided to interact with inclined follower surfaces 104 presented at the intersection of the opposed facing surfaces 90 and the free edges 92 on each side wall 68 and 70 of the locking verification clip 20. In order to facilitate the flaring separation of the side walls 32 occasioned when the follower surfaces 104 are moved along the camming surfaces 102, the transverse base wall 66 may, at least modestly, be arcuately curved, as at 106.

ASSEMBLY

As should now be appreciated, one may, with relative ease, position, with just one hand, the trunnion 16 to enter between the flared guide surfaces 38 of each socket 36 and travel therealong to the juncture of the race 40 in each socket 36 with the flared guide surfaces 38. If each race 40 is slightly in excess of 180°, the bearing surfaces 60 on the trunnion pivot pin 58 will snap through the juncture of the flared surfaces 34 in each socket 36 and the race 40 in that socket 36 rotatably to engage the corresponding race 40 associated with each side wall 32 of the bifurcated gudgeon 26. This initial capture of the bearing surfaces 60 on the trunnion pivot pin 58 against the races 40 of the respective sockets 36 need only be sufficient to maintain the trunnion 16 in situ within the sockets 36 until the locking verification clip 20 is operatively secured to the bifurcated gudgeon 26.

By employing the tether strap 72, the locking verification clip 20 is already conveniently disposed for manipulation by just one hand. The locking verification clip 20 is now manipulated on the tether strap 72 to bring the rounded noses 86 on each locating rib 84 into sliding engagement with the corresponding locating recess 88. With the coupler components so disposed, manually forcing the transverse base wall 66 toward the bifurcated gudgeon 26 brings the inclined follower surfaces 104 on the locking verification clip 20 into engagement with the inclined camming surface 102 presented from the locking pawls 94 on the gudgeon 26, such that continued finger pressure against the base wall 66 will force the follower surfaces 104 to slide along their respective camming surfaces 102 until the locking engagement surface 98 on each locking pawl 94 drops into the lock notches 96 in the side walls 68 and 70 of the locking verification clip 20. Curving the base wall 66, as at 106, facilitates bending of the base wall 66 forced by the interaction of the camming and follower surfaces 102 and 104, respectively, not only when the locking verification clip 20 is being applied to the other two components of the coupler 10 but also when one desires to disengage the coupler. In that situation, the base wall must be manually splayed, as by spreading the free edges 92A and 92B in order to disengage the locking pawls 94 from the lock notches 96.

CONCLUSION

While one preferred embodiment of the present invention is disclosed, it is to be clearly understood that the invention is susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that a novel coupler embodying the concepts of the present invention can be assembled with relative ease by the use of just one hand and without the need for either tools or loose parts and with minimal assembly forces, but also that the other aspects of the invention can be likewise accomplished.

We claim:

1. A coupler for effecting a selectively releasable connection between first and second relatively movable members, said coupler comprising:

a receiver adapted to be secured to the first relatively movable member;

said receiver being bifurcated to present a gudgeon having laterally spaced, generally parallel, side walls;

a generally semi-cylindrical first race provided in each said gudgeon side wall;

said races being laterally disposed in spaced opposition;

a transversely oriented trunnion adapted to be secured to the second relatively movable member;

said trunnion having spaced bearing surfaces;

said bearing surfaces being selectively receivable within said opposed first races;

a locking verification clip;

said locking verification clip having generally semi-cylindrical second races;

said second races operatively engaging said bearing surfaces on said trunnion in opposition to the engagement of said bearing surfaces with said first races;

locking means selectively to secure said locking verification clip to said receiver so as to maintain the engagement of said first and second races with respect to said bearing surfaces on said trunnion, said receiver further comprising a housing having inboard and outboard end portions, said bifurcated gudgeon located at said outboard end portion, said gudgeon including a base from which said gudgeon side walls extend; and a tether strap attached to said housing inboard end and adapted to maintain said locking verification clip in close proximity to said receiver even when disengaged therefrom.

2. The coupler, as set forth in claim 1, wherein:

said first races extend circumferentially for slightly more than 180°.

3. The coupler, as set forth in claim 1, further comprising:

a socket recessed in each said gudgeon side wall;

said sockets disposed in spaced opposition;

each of said first races being disposed in one of said sockets;

each said socket having guide surfaces that flare outwardly from said first race to terminate in an entrance to accept admission of said bearing surfaces on said trunnion.

4. The coupler, as set forth in claim 3, further comprising:

a web defining the outer extremity of said socket to enhance the structural integrity of said gudgeon side walls.

5. The coupler, as set forth in claim 1, wherein said locking verification clip further comprises:

a base wall and laterally spaced first and second side walls disposed in a generally U-shaped configuration;

a pair of pedestals extending from said base wall in laterally spaced, substantially parallel disposition between said side walls; and, said pedestals presenting said second races.

6. The coupler, as set forth in claim 5, wherein:

said locking verification clip base is arcuately curved to facilitate pivotal movement of said locking verification clip side walls during the locking and unlocking procedure.

7. The coupler, as set forth in claim 5, further comprising:

at least one locating rib presented from said gudgeon side walls;

a locating recess presented from the side walls of said locking verification clip; and, each said locating rib adapted to be received within one said locating recess accurately to orient said locking verification clip with respect to said bifurcated gudgeon.

8. The coupler, as set forth in claim 7, further comprising:

a rounded nose on said locating rib to facilitate entry of said locating rib within said locating recess.

9. The coupler, as set forth in claim 8, wherein:

said locating recess is flared at the location where said locating rib first enters said locating recess further to facilitate entry of said locating rib in said locating recess.

10. The coupler, as set forth in claim 6, wherein;

said sockets are provided in each said gudgeon side wall to be disposed in spaced opposition;

each said socket having guide surfaces that flare outwardly from said first race to terminate in an entrance.

11. The coupler, as set forth in claim 10, further comprising:

a locking recess incorporated in said locking verification clip side wall; and, lock pawls provided on said gudgeon side walls to engage said locking recesses and to retain said locking verification clip on said receiver and thereby maintain the operative engagement of said coupler.

12. The coupler, as set forth in claim 3, further comprising:

a keyhole aperture in said tether strap;

said keyhole aperture permitting said tether strap to be buttonholed onto said receiver.

13. The coupler, as set forth in claim 12, where in:

said keyhole aperture presents a circular edge portion; and, a circumferential notch is provided in said receiver to receive said circular edge.

14. The coupler, as set forth in claim 11, wherein:

lock notches are provide in the side walls of said locking verification clip matingly to receive said locking pawls;

a lock engagement surface is provided on said locking pawls; and, a blocking surface is provided on said lock notches to interact with said lock engagement surface.

15. The coupler, as set forth in claim 14, wherein:

an inclined camming surface is provide on said locking pawl; and, an inclined follower surface is provided in each said locking verification clip to interact with said camming surface to effect the movement of the locking verification clip side walls required to achieve entry of the locking pawls into said lock notches during the locking procedure.

16. The coupler, as set forth in claim 9, further comprising:

bearing surfaces oriented transversely with respect to said trunnion adapted slidingly to engage opposed faces on said gudgeon side walls.

17. A coupler for effecting a selectively releasable connection between an axially translatable rod and a lever arm that swings about an axis oriented generally transversely of the axis along which the rod translates, said coupler comprising:

a receiver adapted to be secured to the axially translatable rod;

said receiver being bifurcated to present laterally spaced side walls;

each said side wall having first and second, generally planar lateral surfaces;

said first lateral surfaces on said side walls facing each other in spaced opposition;

said second lateral surfaces on said side walls facing in opposite directions;

each said first lateral surface having a socket that flares outwardly from a substantially semi-cylindrical race;

said socket opening in substantial alignment with the lever arm;

means adapting the lever arm to terminate in a transversely oriented trunnion having longitudinally spaced bearing surfaces;

said bearing surfaces engaging said laterally disposed races in said sockets;

a locking verification clip;

said locking verification clip being generally U-shaped with a base wall and laterally spaced first and second side walls;

a pair of pedestals extending from said base wall in laterally spaced, substantially parallel disposition;

each pedestal terminating in a second race;

said second races operatively engaging said bearing surface on said trunnion;

a locking recess incorporated in said locking verification clip side wall; and, lock pawls on said side walls of said receiver engaging said locking recesses to retain said locking verification clip on said receiver and thereby maintain the operative engagement of said coupler.

18. A coupler for effecting a selectively releasable connection between an axially translatable member and a lever arm that swings about an axis oriented generally transversely of the axially translatable member, said coupler comprising:

a receiver housing adapted to be secured to the axially translatable member of the members being so joined;

said receiver being bifurcated to present sockets in spaced opposition;

each said socket having guide surfaces that flare outwardly from a first race to terminate in an entrance;

the lever arm to present a transversely oriented trunnion;

said trunnion presenting outer bearing surfaces and transverse stabilizing shoulders;

said outer bearing surfaces being selectively receivable within said opposed sockets operatively to engage said first races;

a locking verification clip;

said locking verification clip being generally U-shaped with a base wall and laterally spaced first and second side walls;

a pair of pedestals extending from said base wall in laterally spaced, substantially parallel disposition between, and also parallel to, said side walls;

each said pedestal terminating in a second race;

said second races operatively engaging said outer bearing surfaces on said trunnion in opposition to the engagement of said bearing surfaces with said first sockets; and, locking means selectively to secure said locking verification clip to said receiver housing so as to capture said bearing surfaces on said trunnion with respect to said first and second races.

\* \* \* \* \*